(12) United States Patent  (10) Patent No.: US 8,376,904 B2
Eisele  (45) Date of Patent: Feb. 19, 2013

(54) MOTOR VEHICLE

(75) Inventor: Markus Eisele, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 407 days.

(21) Appl. No.: 12/788,484

(22) Filed: May 27, 2010

(65) Prior Publication Data

US 2010/0311539 A1  Dec. 9, 2010

(30) Foreign Application Priority Data

Jun. 5, 2009 (DE) .......................... 10 2009 026 788

(51) Int. Cl.
*B60K 1/02* (2006.01)
(52) U.S. Cl. ........................................... 477/3; 903/930
(58) Field of Classification Search ....... 477/3; 903/930
See application file for complete search history.

(56) References Cited

U.S. PATENT DOCUMENTS

2009/0118078 A1* 5/2009 Wilmanowicz et al. .......... 477/3
2009/0118931 A1* 5/2009 Kaminsky et al. ............... 701/54

* cited by examiner

*Primary Examiner* — Edwin A Young
(74) *Attorney, Agent, or Firm* — David & Bujold, PLLC

(57) ABSTRACT

A motor vehicle with a hybrid drive system (1) comprising an internal combustion engine and an electric machine, one of an automatic or automated transmission (2) connected between the hybrid drive (1) and a drive output (3) and a driver-operated element (4). The driver-operated element (4) has several conditions that can be selected by a driver with which one of a number of driving ranges or one of several groups of gears are associated for operation of the transmission. The driver-operated element (4) has at least one condition that can be selected by the driver with which, alternatively or in addition to a driving range or group of gears, a hybrid function mode is associated.

8 Claims, 1 Drawing Sheet

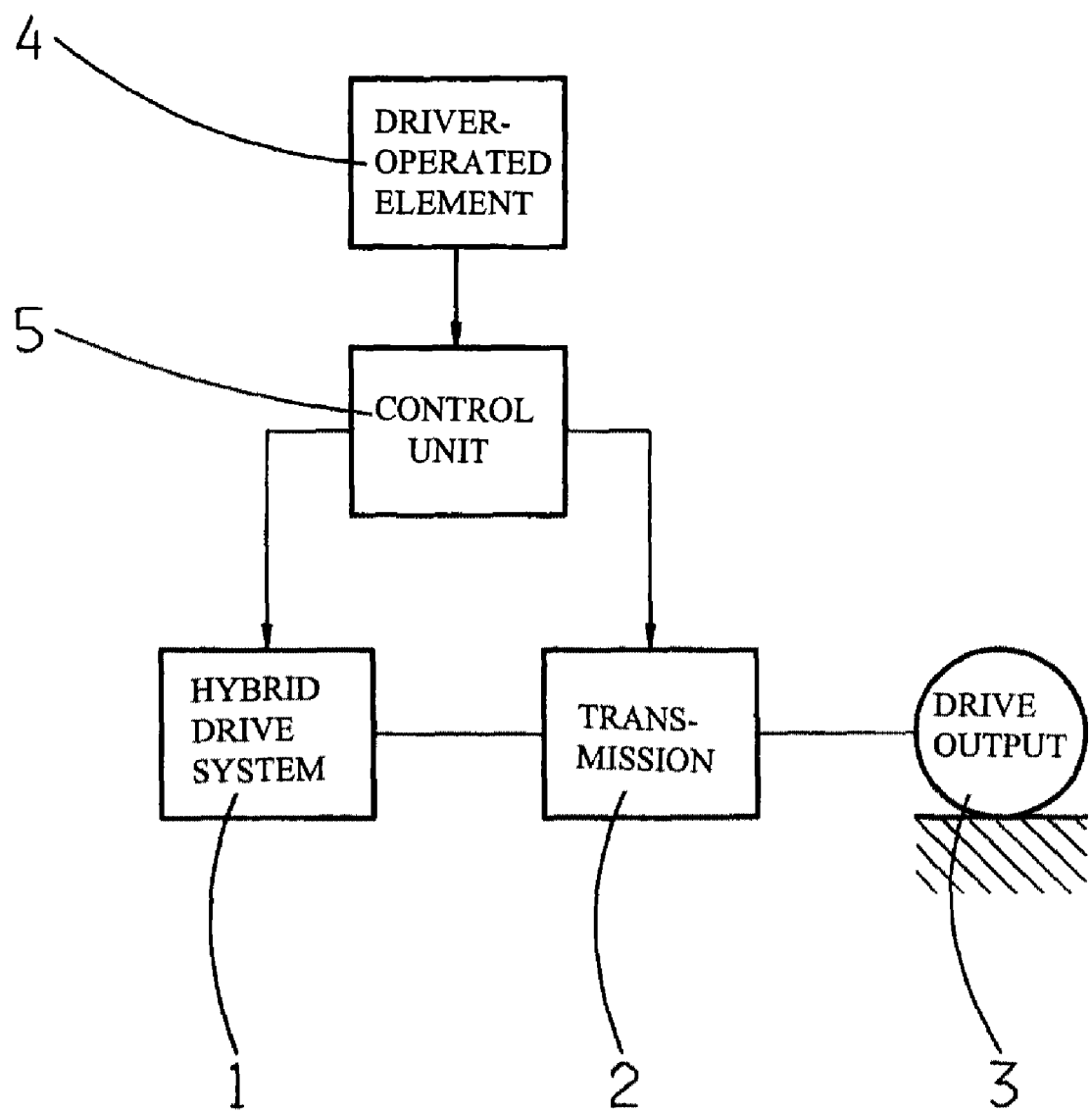

though no driving range or gear group is associated with this condition of the driver-operated element.

MOTOR VEHICLE

This application claims priority from German patent application serial no. 10 2009 026 788.3 filed Jun. 5, 2009.

FIELD OF THE INVENTION

The invention concerns a motor vehicle with a hybrid.

BACKGROUND OF THE INVENTION

Besides a hybrid drive system, a hybrid vehicle comprises a transmission connected between the hybrid drive and a drive output, the transmission preferably being an automatic or automated manual transmission. Co-operating with the transmission is a driver-operated element which can be made, for example, as a rotating drive switch, or a drive switch keyboard or a selector lever. Such a driver-operated element has several conditions that can be selected by a driver, each of which is associated with driving ranges or one of several gear groups for the operation of the transmission. Until now motor vehicles have been known from the prior art, whose driver-operated elements can assume conditions associated with the driving ranges D (Drive), R (Reverse) and N (Neutral). In addition driver-operated elements are known, which have further conditions with which driving ranges are associated, such as the driving ranges 1, 2 and 3, each of which comprises some part of the group of gears available in driving range D.

In hybrid vehicles intended to be operated with minimal fuel consumption and also harmful substance emissions, it can be provided that the hybrid function mode of the hybrid drive can be selected deliberately by a driver of the motor vehicle. Such hybrid function modes, for example, may be those of "combustion engine off", "zero-emission drive" or "zero-emission drive prepare", which can be activated by a driver for example for emission-free driving in a pedestrian zone.

Another hybrid function mode can be that of "combustion engine permanently on" which, for example, can be activated by a driver if the motor vehicle has to drive up a long slope. Other hybrid function modes that a driver can select may be those of "charge energy accumulator", "discharge energy accumulator" and "suppress engine start/stop", which the driver should be able to activate manually in certain conditions of the motor vehicle. For each hybrid function mode that can be activated by a driver an interface to the driver must be prepared, which enables the driver to activate or deactivate the respective hybrid function modes manually. This increases the number of operating elements that have to be integrated in an instrument panel of a motor vehicle as well as the vehicle's wiring complexity. This is disadvantageous from the standpoints of both clarity and costs.

SUMMARY OF THE INVENTION

Starting from there, the present invention addresses the problem of providing a new type of motor vehicle. This problem is solved by a motor vehicle according to claim 1. According to the invention, the driver-operated element has at least one condition that can be selected by the driver, with which is associated a hybrid function mode alternatively or in addition to a driving range or a group of gears.

With the present invention, it is proposed for the first time that a driver-operated element has a condition that can be selected by a driver, which is associated with a hybrid function mode and/or a driving range or group of gears, so that by actuating the driver-operated element a hybrid function mode is activated or deactivated. Thus the invention makes use of the driver-operated element as an interface with the driver for hybrid function modes, so there is no need for a separate interface for hybrid function modes. This improves the clarity and reduces the wiring complexity.

BRIEF DESCRIPTION OF THE DRAWING

Preferred further developments of the invention emerge from the subordinate claims and from the description given below. An example embodiment of the invention, to which it is not limited, is described in greater detail with reference to the drawing, which shows:

The sole FIGURE is a block circuit diagram of a motor vehicle

DETAILED DESCRIPTION OF THE PREFERRED EMBODIMENTS

The sole FIGURE shows a schematic block circuit diagram of a motor vehicle with a hybrid drive system 1 and a transmission 2 connected between the hybrid drive 1 and a drive output 3. The hybrid drive 1 comprises an internal combustion engine and an electric machine, such that the electric machine can be operated as a motor or a generator. The transmission 2 is preferably an automatic or automated manual transmission.

The motor vehicle has a driver-operated element 4 that can be actuated by a driver, with the conditions of the driver-operated element 4 being evaluated in a control unit 5 in order to influence operation of the hybrid drive 1 and/or the transmission 2. The control unit 5 can be a hybrid control unit, a transmission control unit or an engine control unit.

The driver-operated element 4 has several conditions that can be selected by a driver, with which one of several driving ranges or groups of gears for operating of the transmission 2 is associated. The driver-operated element 4 has at least three conditions that can be selected by a driver, with which exclusively one driving range or group of gears is associated, namely a first selectable condition with which the driving range D (Drive) for forward driving is associated, a second selectable condition with which the driving range R (Reverse) for reverse driving is associated, and a third selectable condition with which the driving range N (Neutral) for a neutral position of the transmission 2 is associated.

In passenger cars the driver-operated element 4 has one further condition with which exclusively one driving range or gear group is associated, namely a condition associated with the P (Park) driving range. Driver-operated elements of utility vehicles typically have no such condition associated with the P driving range.

In the sense of the present invention, the driver-operated element 4 has at least one condition that can be selected by the driver, with which, alternatively or in addition to a driving range or group of gears, a hybrid function mode is associated. According to the invention the driver-operated element then serves not only as an interface with the driver for selecting or activating a driving range, but rather, also, as an interface with the driver for selecting or activating a hybrid function mode.

According to a first advantageous further development of the invention the driver-operated element 4 has at least one condition that can be selected by the driver, which is not associated with any gear grouping and thus with no driving range, but exclusively with a hybrid function mode so that when the driver-operated element 4 has been actuated, it assumes a condition associated with a hybrid function mode such that the hybrid function mode can be activated while maintaining the current driving range or gear group.

According to this further development of the invention, it can be provided that some conditions of the driver-operated element 4 that can be selected by the driver are associated exclusively with the driving ranges D, R and N, while in contrast, other conditions of the driver-operated element, which were associated with the driving ranges 1, 2 and 3 in the prior art, are now associated with hybrid function modes, for example the hybrid function modes "combustion engine permanently on", "combustion engine permanently off" and "charging the battery".

In such a case, if the motor vehicle is being operated in the driving range D and the driver-operated element 4 is then changed to a condition exclusively associated with one of the hybrid function modes, the driving range D is maintained and the hybrid function mode concerned is activated. The hybrid function mode can be deactivated by switching out of the condition concerned According to a second advantageous further development of the present invention, it is possible for the driver-operated element 4 to have at least one condition that can be selected by a driver, which is associated both with a driving range or gear group and also with a hybrid function mode, so that in such a driving range, the driving range is smaller compared with the driving range D, for example by one or more of the driving ranges 1, 2 and 3.

In accordance with this second advantageous development of the invention, when after the actuation of the driver-operated element it assumes a condition with which both a driving range or group of gears and a hybrid function mode are associated, the hybrid function mode can be activated taking into account the previous condition of the driver-operated element 4, or taking into account the time sequence of conditions assumed by the driver-operated element 4, or taking into account the current driving situation of the motor vehicle.

In this case, if the hybrid function mode is actuated by taking into account the previous condition of the driver-operated element 4, the procedure preferably adopted is that when the driver-operated element 4 is actuated and assumes a condition with which both a driving range or group of gears and also a hybrid function mode are associated, and if the previous condition of the driver-operated element 4 corresponds to the driving range D, the hybrid function mode can be activated.

On the other hand, if after the driver-operated element 4 is actuated it assumes a condition with which both a driving range or group of gears and also a hybrid function mode are associated and the previous condition of the driver-operated element 4 corresponds to the driving range N, then the hybrid function mode cannot be activated. Rather, in this case the driving range reduced by comparison with the driving range D can be activated.

Likewise, if after the driver-operated element 4 is actuated it assumes a condition with which both a driving range or group of gears and a hybrid function mode are associated, then it is preferable, if the previous condition of the driver-operated element 4 corresponds to the R driving range, for the hybrid function mode not to be activated. Rather, in such a case the driving range reduced by comparison with driving range D can again be activated.

As already explained, if after the driver-operated element 4 is actuated it assumes a condition with which both a driving range or group of gears and a hybrid function mode are associated, the hybrid function mode can also be activated by taking into account the time sequence of the conditions assumed by the driver-operated element 4. In this connection it can be provided that if after the driver-operated element 4 is actuated it permanently assumes a condition with which both a driving range or group of gears and a hybrid function mode are associated, the hybrid function mode cannot be activated, but instead the driving range that is reduced compared to the driving range D is actuated. In contrast, if after actuation of the driver-operated element 4 it assumes a condition in which, during a defined time period, it is associated both with a driving range or group of gears and also with a hybrid function mode, and when subsequently it assumes a condition corresponding to the driving range D, the hybrid function mode can be activated and not the driving range reduced compared to the driving range D.

Furthermore, according to the present invention it can be provided that if after actuation the driver-operated element 4 assumes a condition associated both with a driving range or group of gears and also with a hybrid function mode, the hybrid function mode can be activated taking into account the current driving situation of the motor vehicle.

In this connection, for example it can be provided that if the motor vehicle is being operated in driving range D and then the driver-operated element 4 assumes a condition associated with both a driving range and a hybrid function mode, then a hybrid function mode is activated but the type of hybrid function mode is selected depending on the driving condition or situation of the motor vehicle. For example it can be provided that if the motor vehicle accelerates, in that case the hybrid function mode "charge the energy accumulator" is selected, whereas in contrast, if a brake pedal is actuated while at low speed, for example the hybrid function mode activated is "suppress engine start/stop".

The driver-operated element 4 can be of any appropriate design. For example the driver-operated element 4 can be a rotary driving switch, a drive keyboard or a selector lever. The individual rotation positions of the switch, or the individual positions of a selector lever, or the individual keys of the drive keyboard are then associated with labels or pictograms that correspond to a hybrid function mode associated with that respective condition of the driver-operated element or to a driving range associated with the condition.

INDEXES

1 Drive system
2 Transmission
3 Drive output
4 Driver-operated element
5 Control unit

The invention claimed is:

1. A motor vehicle with a hybrid drive (1) comprising an internal combustion engine and an electric machine, either an automatic or an automated transmission (2) connected between the hybrid drive (1) and a drive output (3), a control unit (5) for controlling the hybrid drive (1) and the transmission (2), a driver-operated element (4) with which, via the control unit (5), operation of the hybrid drive (1) and the transmission (2) being influenced, the driver-operated element (4) having several conditions selectable by a driver by which either one of a number of driving ranges or one of several groups of gears are associated for the operation of the transmission, the driver-operated element (4) having at least one condition being selectable by the driver with which, alternatively to or in addition to a driving range or group of gears, a hybrid function mode is associated, the driver-operated element (4) having at least one condition that is selectable by the driver which is associated both with the driving range or the group of gears and with the hybrid function mode, and the at least one condition is a driving range reduced in comparison with a drive driving range (D), if, after being actuated, the driver-operated element (4) assuming a condition associated both with the driving range or the group of gears and with the hybrid function mode, then the hybrid function mode being activated by taking into account a time sequence of the conditions assumed by the driver-operated element (4), and if, after being actuated, the driver-operated element (4) assuming, on a sustained basis, a condition associated both with the driving range or the group of gears and with the hybrid function mode, then the hybrid function mode is prevented from being activated and instead the drive range, reduced in comparison with the drive driving range (D), being activated.

2. The motor vehicle according to claim 1, wherein the driver-operated element (4) has at least three selectable conditions that are selectable by the driver with which the driving range or the group of gears is exclusively associated, and the at least three selectable conditions are a first selectable condition associated with the drive driving range (D), a second selectable condition associated with a reverse driving range (R), and a third selectable condition associated with a neutral driving range (N).

3. The motor vehicle according to claim 1, wherein the driver-operated element (4) has at least one condition that is selectable by the driver, with which the hybrid function mode is exclusively associated and when, after the driver-operated element (4) is actuated, the driver-operated element (4) assumes a condition exclusively associated with the hybrid function mode, the hybrid function mode is actuatable while maintaining a current driving range or a current group of gears.

4. The motor vehicle according to claim 1, wherein, if after being activated, the driver-operated element (4) assumes a condition associated both with the driving range or the group of gears and with the hybrid function mode, then the hybrid function mode is actuatable by taking into account a previous condition of the driver-operated element (4).

5. The motor vehicle according to claim 1, wherein, if after being actuated, the driver-operated element (4) assumes a condition associated both with the driving range or the group of gears and with the hybrid function mode and if the previous condition of the driver-operated element (4) corresponds to a drive driving range (D), then the hybrid function mode is activated.

6. The motor vehicle according to claim 1, wherein, if after being actuated, the driver-operated element (4) assumes a condition, for a defined time, which is associated both with the driving range or the group of gears and with the hybrid function mode, and if the driver-operated element (4) then assumes a condition corresponding to the drive driving range (D), then the hybrid function mode is activatable.

7. The motor vehicle according to claim 1, wherein, if after being actuated, the driver-operated element (4) assumes a condition associated both with the driving range or the group of gears and with the hybrid function mode, then the hybrid function mode is actuatable by taking into account a current driving situation of the motor vehicle.

8. A motor vehicle with a hybrid drive (1) comprising an internal combustion engine and an electric machine, either an automatic or an automated transmission (2) connected between the hybrid drive (1) and a drive output (3), a control unit (5) for controlling the hybrid drive (1) and the transmission (2), a driver-operated element (4) with which, via the control unit (5), operation of the hybrid drive (1) and the transmission (2) being influenced, the driver-operated element (4) having several conditions selectable by a driver by which either one of a number of driving ranges or one of several groups of gears are associated for the operation of the transmission, the driver-operated element (4) having at least one condition selectable by the driver with which, alternatively to or in addition to a driving range or group of gears, a hybrid function mode is associated, the driver-operated element (4) having at least one condition that is selectable by the driver which is associated both with the driving range or the group of gears and with the hybrid function mode, and the at least one condition is a driving range reduced in comparison with a drive driving range (D), if, after being activated, the driver-operated element (4) assuming a condition associated both with the driving range or the group of gears and with the hybrid function mode, the hybrid function mode being actuatable by taking into account a previous condition of the driver-operated element (4), if, after being actuated, the driver-operated element (4) assuming a condition associated both with the driving range or the group of gears and with the hybrid function mode and, if the previous condition of the driver-operated element (4) corresponds to a neutral driving range (N), then the hybrid function mode is prevented from being activated, and if the hybrid function mode is prevented from actuation, then the driving range, reduced in comparison with the drive driving range (D), is activated.

* * * * *